$$\text{2,927,903}$$

United States Patent Office
2,927,903
Patented Mar. 8, 1960

2,927,903

PREPARATION OF ALUMINA-CONTAINING CATALYSTS

William G. Nixon, Westchester, Ill., assignor, by mesne assignments, to Universal Oil Products Company, Des Plaines, Ill., a corporation of Delaware No Drawing. Application September 17, 1957
Serial No. 684,428

9 Claims. (Cl. 252—466)

The present invention relates to a method for manufacturing an activated form of alumina, and is specifically directed towards the manufacture of activated alumina for use as the catalytically active carrier material for metal containing catalysts. The activated alumina of the present invention is particularly advantageous when employed in the manufacture of noble metal-containing catalyst, especially catalyst containing platinum.

Alumina, in its many anhydrous forms or as aluminum oxide hydrate, is extensively employed in many chemical and petroleum industries. Alumina is often employed as a catalyst in itself, and/or serves as a catalytically active carrier material for other catalytic components, particularly metals and compounds thereof. Alumina is widely employed as a dehydrating, treating or purifying agent, and, due to its inherent stability up to temperatures of about 1800° F., enjoys widespread use as a refractory material. Various physical modifications of the previously mentioned forms of alumina result in an alumina which is commonly referred to as "activated alumina." This form of alumina possesses a particularly desired high degree of catalytic activity and adsorptive capacity. An object of the present invention is to provide a method for producing an activated form of alumina for utilization as hereinbefore described.

In the present specification and appended claims, the term "alumina" is employed to mean porous aluminum oxide in all states of oxidation and in all states of hydration, as well as aluminum hydroxide. The alumina may be synthetically prepared or it may be naturally occurring, and may be of the crystalline or gel type. Whatever form of alumina is employed, it may be treated, prior to use, by one or more treatments with acids, alkalis or other chemical compounds, or by physical treatments including drying, calcining, steaming, etc. The various forms of alumina are known by many trival and trade names and it is intended to include all such forms. The typical aluminas hereinabove set forth are to be considered illustrative rather than limiting unduly the broad scope of the present invention: it is understood that the method of the present invention will enhance the desired physical properties of alumina, regardless of its original form.

As hereinabove set forth, alumina has attained extensive commercial utility, particularly in the petroleum industry, as the carrier material employed in the manufacture of catalytic composites containing metallic components. Such composites are employed to promote a multitude of reactions among which are hydrogenation, cyclization, cracking, polymerization, dehydrogenation, sulfurization, alkylation, hydrocracking, oxidation and isomerization. A specific object of the present invention is to produce an activated form of alumina which is particularly advantageous when employed as the carrier material in the manufacture of catalytic composites containing metallic components.

In one embodiment, the present invention provides an improvement in the process of manufacturing alumina which comprises subjecting the alumina to the action of an oxide of nitrogen selected from the group consisting of nitric oxide, nitrogen dioxide and mixtures thereof.

In another embodiment, the present invention provides a method for manufacturing a metallic component-alumina catalyst which comprises subjecting calcined alumina to the action of an oxide of nitrogen selected from the group consisting of nitric oxide, nitrogen dioxide and mixtures thereof prior to combining said metallic component therewith.

As hereinabove stated, catalysts are employed throughout industries in a multitude of processes. A great majority of these catalysts contain a metal component, and catalysts have been made which comprise combinations of two or more metal components. In the interest of simplicity, the following discussion will be limited to those catalytic composites containing noble metals, particularly platinum and/or palladium. Although the method of the present invention is specifically directed to catalytic composites containing platinum and/or palladium, composites containing other metals can be improved through the utilization of the activated alumina manufactured in accordance with the method of the present invention. Other metals can be composited with the alumina and subsequently employed therewith as components of a catalyst, with or without platinum or palladium present. These catalytic composites comprise metallic components such as, but not limited to, cesium, vanadium, chromium, tungsten, cobalt, copper, sodium and other alkali metals, silver, iridium, rhodium, ruthenium, rhenium, molybdenum, nickel, other metals of group VI and VIII of the periodic table, mixtures of two or more, etc. It is understood that the metal components may exist either in the elemental state or in combination as the halide, oxide, nitrate, sulfate, etc.

Other refractory inorganic oxide material may be combined with the alumina without unduly limiting the broad scope of the present invention. These refractory inorganic oxides include silica, zirconia, magnesia, boria, thoria, strontia, titania, etc., and mixtures of two or more may be combined with the alumina, for example, silica-alumina-zirconia, alumina-magnesia-zirconia, etc. It is understood that the refractory inorganic oxides hereinabove set forth are intended to be illustrative rather than limiting the method of the present invention. It is further understood that these refractory inorganic oxides may be manufactured by any suitable method, or they may be naturally occurring substances such as clays or earths which may be purified with special treatment.

Generally, the amount of the metal component composited with the catalyst is small compared to the quantities of the other components combined therewith. For example, platinum and/or palladium will generally comprise from about 0.01% to about 5% by weight of the total catalyst, and usually from about 0.1% to about 1% by weight. The use of other metal components, with or without platinum and/or palladium, is dependent upon the use for which the particular catalyst is intended. In any case, however, the concentrations of the metal components will be small, and will generally be within the range of from about 0.01% to about 5% by weight of the total catalyst.

Halogen is often composited with the catalyst in concentrations of from about 0.01% to about 8% by weight.

of the total catalyst and may be either fluorine, chlorine, iodine, bromine or mixtures of the same. In general, fluorine appears to be less easily removed from the catalyst, particularly during the process in which the catalyst is employed, and is, therefore, preferred in many instances. It is understood that the halogen may comprise a mixture of two or more of the aforementioned halogens: a particularly preferred mixture comprises fluorine and chlorine. The halogen is believed to be combined with one or more of the other components of the catalyst, and is, therefore, usually referred to as combined halogen.

The catalyst composite utilizing the activated alumina of the present invention may be made in any suitable manner, and when of two or more active metallic components, may be made by separate, successive or coprecipitation methods. Alumina may be formed into any desired shape such as spheres, pills, powder, granules, etc. A preferred form of alumina is the sphere, and they may be continuously manufactured by passing droplets of an alumina sol into an oil bath maintained at an elevated temperature, retaining the droplets in said oil bath until the droplets set to hydrogel spheres. The spheres are continuously withdrawn from the oil bath and immediately thereafter subjected to specific aging treatments to impart certain desired physical characteristics thereto. Although alumina may be treated by the method of the present invention prior to being formed into the desired shape, it is preferred that the alumina exist in the desired shape, be subjected to high-temperature calcination, and subsequently treated in accordance with the method of the present invention.

The halogen may be added to the composite in any suitable manner, and either before or after the formation of the alumina. While halogen may be added as such, the halogen may also be added as an aqueous solution of a hydrogen halide or an aluminum halide. In the preferred method, the halogen is added to the alumina before the other components are composited therewith. The halogen may be incorporated into the alumina before forming into particles, and this may be accomplished through the use of an acid such as hydrogen fluoride, hydrogen chloride, hydrogen bromide and/or hydrogen iodide. In some cases, volatile salts such as ammonium fluoride, ammonium chloride, ammonium bromide, etc. may be employed. In other cases the alumina may be prepared from the aluminum halide such as aluminum chloride, aluminum fluoride, etc., which method affords a convenient means of compositing the halogen while manufacturing the alumina.

In accordance with the method of the present invention, the preformed alumina spheres, either with or without combined halogen, are subjected to the action of an oxide of nitrogen selected from the group consisting of nitric oxide, nitrogen dioxide and mixtures thereof. It is understood that the alumina need not necessarily exist in the form in which it is finally desired. For example, the alumina may be ground to a fine powder, treated with the oxide of nitrogen and subsequently formed into pills, pellets, cakes, etc. It is, however, preferred that the alumina is treated with the oxide of nitrogen prior to the addition of the active metallic component thereto. As hereinafter described, a particular embodiment of the present invention comprises treating the alumina with the oxide of nitrogen, compositing the metallic components therewith and subsequently treating the resulting composite with an oxide of nitrogen.

In some instances, it may be desired to treat the alumina with various reagents during the manufacturing process, and such treatments do not remove the alumina from the broad scope of the present invention. Reagents which may be employed in treating the alumina include mineral acids, organic acids, alkaline solutions, acid-salt solutions, hydrogen halides, alcohols, aminophenols, amides, amines, etc.

The oxides of nitrogen, nitric oxide, nitrogen dioxide and mixtures thereof, need not necessarily be employed per se: they may be utilized in a single treatment as a mixture, or in successive treatments employing each oxide of nitrogen individually. The oxides of nitrogen may be admixed with various diluents such as air, nitrogen, carbon dioxide, etc. They may result from other compounds and mixtures which either yield the same at reaction conditions or from them in situ. For example, it is known that $N_2O_4$ will yield nitrogen dioxide at the reaction conditions which are hereinafter set forth.

Briefly, the preferred method of manufacturing activated alumina, in accordance with the method of the present invention, and for use as the catalytically active carrier material in the manufacture of catalyst such as a platinum-containing catalyst, comprises subjecting alumina to the action of an oxide of nitrogen selected from the group consisting of nitric oxide, nitrogen dioxide and mixtures thereof. The particular method by which the alumina has been manufactured and/or formed into particles of definite size and shape is immaterial. It is preferred, however, that the alumina is subjected to a calcination treatment at a temperature within the range of from about 200° C. to about 800° C. The calcined alumina is then subjected to the action of the particular oxide of nitrogen at a temperature of from about 25° C. to about 1000° C. Intermediate temperatures may be advantageously utilized, and the preferred temperature lies within the range of from about 200° C. to about 500° C. When the activated alumina is to be employed as the carrier material in the manufacture of catalyst, the various metallic components, as hereinbefore described, may be composited therewith in any suitable manner. Likewise, the halogen may be composited in any suitable manner, if such halogen has not been composited previously therewith.

The catalytic composite, after all the catalytic components have been combined therewith, generally exists in a wet state containing a substantial quantity of water remaining from the various impregnating and treating solutions. The excess water may be removed effectively by drying the catalyst at any suitable temperature within the range of from about 25° C. to about 600° C. In order to avoid the sudden evolution of gas, resulting thereby in the destruction of the structure of the catalyst, it is preferred that the water be removed at lower temperatures. Thus, the composite is dried at a temperature within the range of from about 50° C. to about 100° C. To further activate the resulting catalytic composite, it is subjected to a second treatment with an oxide of nitrogen selected from the group consisting of nitric oxide, nitrogen dioxide and mixtures thereof. As previously described, the treatment is effected at a temperature within the preferred range of from about 200° C. to about 500° C. This second treatment with the oxide of nitrogen is followed by sweeping the catalytic composite with a suitable gaseous material not exhibiting a reducing action on the oxide of nitrogen to remove traces thereof. Thereafter, the composite is subjected to a reducing treatment at a temperature within the range of from about 150° C. to about 650° C. The sweeping treatment is designed to prevent the conversion of traces of the oxide of nitrogen to substances which detrimentally affect the activity and stability of the catalyst produced. For example, reducing treatments are generally effected at an atmosphere of hydrogen, and it is well known that hydrogen will react with an oxide of nitrogen to form ammonia.

The following examples are introduced to further illustrate the utility of the present invention; it is not intended, however, to limit the broad scope of the invention to the specific materials and conditions involved.

The catalytically active carrier material employed in the examples consisted of alumina prepared from a mixture of equal volumes of a 28% by weight solution of hexamethylenetetramine in water and an aluminum chloride sol containing 12% by weight aluminum and 10.8% by weight combined chloride. Where the analysis of the components of the catalyst indicate the presence of combined fluoride, the fluoride had been added to the alumina by way of an aqueous solution of hydrogen fluoride. The mixture has been formed into hydrogel spheroids by the oil drop method, and the spheres were washed, dried at a temperature of 650° C. and subsequently calcined at that temperature.

EXAMPLE I

A portion of the calcined spheres hereinabove described was commingled with 99 milliliters of an aqueous solution of chloroplatinic acid containing 10 milligrams of platinum per milliliter, plus 60 milliliters of water. The mixture was evaporated to dryness over a water bath at a temperature of 99° C., and further dried in a rotary drier for a period of 3 hours at a temperature of 200° C. The chloride concentration was reduced to a level of 0.31% by weight via a heat-treatment at 500° C. in the presence of steam and air. The composite was thereafter subjected to an air-oxidation treatment at a temperature of 500° C. for a period of 1 hour.

The catalyst was subjected to a particular activity-stability test which consists of passing a standard hydrocarbon charge stock, having a boiling range of about 200° F. to about 400° F., through the catalyst at a liquid hourly space velocity (volumes of hydrocarbon charge per volume of catalyst) of from about 2.0 to about 3.0, in an atmosphere of hydrogen present in a mol ratio of hydrogen to hydrocarbon of 6:1 for a period of about 20 hours. The reaction zone was maintained at a temperature of 500° C., and was under an imposed pressure of 500 p.s.i.g. after a period of about 20 hours, the reaction zone was cooled and depressured and the catalyst portion removed and analyzed for carbon deposition, an indication of the relative stability of the catalyst. Quite often, highly active catalyst will yield excellent results initially, but are insufficiently stable and rapidly lose their capability to function acceptably for prolonged periods of time. The liquid product collected from the reaction zone over the entire period of the test was analyzed for its octane rating (F–1 Clear). This catalyst portion is representative of platinum-containing catalyst, and is employed herein as the reference for comparing catalysts manufactured in accordance with the method of the present invention, utilizing the activated alumina. This reference catalyst is indicated as catalyst "A" in the table which follows.

A second portion of calcined alumina spheres, without combined fluoride, was placed in a glass tube surrounded by a glass-enclosed resistance heater. The alumina was treated, for a period of one hour, with nitric oxide at a rate of 50 cc./min. at a temperature of 300° C. The nitric oxide was diluted with air at a rate of 350 cc./min.

The alumina spheres were allowed to cool to room temperature, and thereafter were commingled with 99 milliliters of an aqueous solution of chloroplatinic acid containing 10 milligrams of platinum per milliliter, plus sufficient water to yield 220 milliliters of total solution. The mixture was evaporated to dryness over a water bath at a temperature of 99° C. and further dried in a rotary drier for a period of 3 hours at a temperature of 200° C. The catalyst was then subjected to an air-oxidation treatment to a temperature of 500° C. for a period of one hour.

The catalyst was subjected to the activity-stability test hereinabove described, and subsequently analyzed for carbon deposition. This catalyst was designated as catalyst "B," and the results of the activity test are indicated in the following table.

Table I

| Catalyst Designation | A | B |
|---|---|---|
| Analysis: | | |
| Platinum, wt. percent | 0.750 | 0.749 |
| Fluoride, wt. percent | 0.350 | |
| Chloride, wt. percent | 0.310 | 0.840 |
| Total Halide, wt. percent | 0.66 | 0.840 |
| Carbon on Used Catalyst, wt. percent | 0.69 | 0.31 |
| Octane Rating of Product, F–1 | 94.0 | 95.5 |
| Excess Receiver Gas, s.c.f./bbl | 860 | 932 |
| Excess Debutanizer Gas, s.c.f./bbl | 435 | 426 |
| Total Excess Gas, s.c.f./bbl | 1,295 | 1,358 |
| Debutanizer Gas Ratio | 0.340 | 0.314 |
| Activity Ratings: | | |
| Debutanizer Overhead— | | |
| At same octane | 100 | 93 |
| At same total gas | 100 | 88 |
| Space Velocity | 100 | 109 |

For the purpose of a clear understanding of the data, several definitions are necessary:

(1) The excess receiver gas is that quantity of gas in excess of the amount required to maintain the desired pressure in the reaction zone. Analyses have shown that this gas is, for all practical purposes, pure hydrogen (approximately 95 mol percent).

(2) The excess debutanizer gas is that gas which is composed of light paraffins, methane, ethane, propane and butane, and some hydrogen, and results mainly from the hydrocracking reactions effected within the reaction zone.

(3) The debutanizer ratio is the ratio of excess debutanizer gas to total excess gas, and is indicative of the relative yield of desirable product in the effluent from the reaction zone—i.e.: the lower the ratio, the greater the yield of liquid product.

(4) The activity ratings are employed on a comparative basis with respect to the catalyst having the high concentration of platinum, which activity ratings are assigned the value of 100: they are first compared at identical octane ratings and total excess gas production, and at equivalent liquid hourly space velocities. In the latter instance, the larger the number, the more active the catalyst, that is, more charge stock could be processed to yield the same quantity and quality of product. In the former instances, the smaller the number, the greater the yield of high-octane, debutanized final product.

This example illustrates the benefits afforded the use of catalyst manufactured with the activated alumina of the present invention. When the results of the activity tests are compared, it is readily ascertained that the catalyst of the present invention, catalyst "B," possesses greater stability and a higher degree of activity than the reference catalyst, catalyst "A." The catalyst of the present invention indicated gains in the activity ratings of 7% for the debutanizer overhead at the same octane rating, 12% at the same quantity of total gas and a 9% gain in space velocity activity. These figures are of greater import when viewed together with the quantity of carbon deposited upon the catalysts—less than 50% by weight of the carbon on the reference catalyst was deposited upon the catalyst of the present invention.

EXAMPLE II 130 grams of calcined alumina spheres (free from combined fluoride) were treated for one hour at a temperature of 200° C. with a mixture consisting of 50 cc./min. of nitric oxide and 350 cc./min. of air. The treated spheres were commingled with 99 milliliters of chloroplatinic acid containing 10 milligrams of platinum per milliliter, plus sufficient water to yield a total solution of 220 milliliters. The mixture was evaporated to dryness over a water bath at a temperature of 99° C., and further dried, in an atmosphere of air, at a temperature of 200° C.

After a brief sweeping treatment with nitrogen, to remove traces of air, the dried catalyst was treated with nitric oxide at a rate of 30 cc./min. for a period of five minutes. The nitric oxide was first introduced at a temperature of 200° C., which temperature was increased to 500° C. The NO-treated catalyst was subsequently swept with nitrogen and air-oxidized for a period of 2 hours, at a temperature of 500° C., to remove traces of nitric oxide, and thereafter subjected to a reducing treatment, in the presence of hydrogen, at a temperature of 500° C. for a period of one hour.

This catalyst was subjected to the activity-stability test hereinbefore set forth and was found to possess a degree of activity and stability greater than either of the catalysts previously described. For example, the debutanizer gas ratio was found to be 0.290: this is a decrease of 14.7% compared to a catalyst "A," and a decrease of 7.6% from the 0.314 experienced with catalyst "B."

The foregoing specification and examples illustrate the method of the present invention, and indicate the benefits to be derived through the utilization of the various embodiments thereof.

I claim as my invention:

1. In the manufacture of catalysts wherein alumina is impregnated with a solution of a compound of a catalytic metal, the improvement which comprises initially subjecting the alumina to the action of at least one oxide of nitrogen selected from the group consisting of nitric oxide and nitrogen dioxide at a temperature of from about 25° C. to about 1000° C., and thereafter impregnating the thus treated alumina with said solution.

2. The method of claim 1 further characterized in that said oxide of nitrogen comprises nitric oxide.

3. The method of claim 1 further characterized in that said oxide of nitrogen comprises nitrogen dioxide.

4. The method of claim 1 further characterized in that said temperature is within the range of from about 200° C. to about 500° C.

5. The process of claim 1 further characterized in that said catalytic metal is selected from groups VI and VIII of the periodic table.

6. The process of claim 1 further characterized in that said catalytic metal is a noble metal.

7. In the manufacture of platinum-alumina catalyst wherein alumina is impregnated with chloroplatinic acid solution, the improvement which comprises initially subjecting the alumina to the action of at least one oxide of nitrogen selected from the group consisting of nitric oxide and nitrogen dioxide at a temperature of from about 25° C. to about 1000° C., and thereafter impregnating the thus treated alumina with said solution.

8. In the manufacture of platinum-alumina catalyst wherein alumina is impregnated with chloroplatinic acid solution, the improvement which comprises initially subjecting the alumina to the action of nitric oxide at a temperature of from about 200° C. to about 500° C., and thereafter impregnating the thus treated alumina with said solution.

9. In the manufacture of platinum-alumina catalyst wherein alumina is impregnated with chloroplatinic acid solution, the improvement which comprises initially subjecting the alumina to the action of nitrogen dioxide at a temperature of from about 200° C. to about 500° C., and thereafter impregnating the thus treated alumina with said solution.

References Cited in the file of this patent

UNITED STATES PATENTS

| | | |
|---|---|---|
| 1,923,652 | Winkler | Aug. 22, 1933 |
| 2,209,458 | Heard | July 30, 1940 |
| 2,566,521 | Haensel | Sept. 4, 1951 |
| 2,781,324 | Haensel | Feb. 12, 1957 |